United States Patent
Anfriani et al.

(10) Patent No.: US 10,671,769 B2
(45) Date of Patent: Jun. 2, 2020

(54) FORECASTING MAINTENANCE OPERATIONS TO BE APPLIED TO AN ENGINE

(71) Applicant: SNECMA, Paris (FR)

(72) Inventors: Alexandre Anfriani, Alfortville (FR); Cyril Brun, Mennecy (FR); Julian Sempere, Cincinnati, OH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 995 days.

(21) Appl. No.: 14/406,426

(22) PCT Filed: Jun. 7, 2013

(86) PCT No.: PCT/FR2013/051306
§ 371 (c)(1),
(2) Date: Dec. 8, 2014

(87) PCT Pub. No.: WO2013/182823
PCT Pub. Date: Dec. 12, 2013

(65) Prior Publication Data
US 2015/0186568 A1  Jul. 2, 2015

(30) Foreign Application Priority Data

Jun. 8, 2012 (FR) ..................... 12 55384

(51) Int. Cl.
*G06F 17/50* (2006.01)
*G06F 30/20* (2020.01)
(Continued)

(52) U.S. Cl.
CPC ............... *G06F 30/20* (2020.01); *B64F 5/60* (2017.01); *G05B 23/0283* (2013.01); *G06Q 10/20* (2013.01); *G06Q 50/30* (2013.01)

(58) Field of Classification Search
None
See application file for complete search history.

(56) References Cited

U.S. PATENT DOCUMENTS

2003/0046382 A1* 3/2003 Nick ................... G05B 9/02
709/224
2004/0044499 A1* 3/2004 House ................. G01R 31/343
702/181
(Continued)

OTHER PUBLICATIONS

Murad S. Samhouri, "An Intelligent Opportunistic Maintenance (OM) System: A Genetic Algorithm Approach", Science and Technology for Humanity (TIC-STH), pp. 60-65, (Sep. 26, 2009) XP031655835.
(Continued)

*Primary Examiner* — Craig C Dorais
(74) *Attorney, Agent, or Firm* — Oblon, McClelland, Maier & Neustadt, L.L.P.

(57) ABSTRACT

A method and system forecasting maintenance operations to be applied to an engine or a part of the engine including a set of components, the system including: a processor building a lifetime model for each component of the set of components; a processor analysing the lifetime model associated with each component to build a set of failure models corresponding to the set of components, each component being associated with a failure model defining an inter-inspection interval reflecting an advanced degradation risk rate lower than a predetermined safety threshold; a processor defining a maintenance strategy including opportunistic inspections on the set of components; and a processor iteratively simulating maintenance actions on the set of components by using the set of failure models and the maintenance strategy to build a global model of relaxed maintenance operations which takes the opportunistic
(Continued)

inspections into account while fulfilling a predetermined safety threshold of each component.

20 Claims, 9 Drawing Sheets

(51) Int. Cl.
*G06Q 50/30* (2012.01)
*G05B 23/02* (2006.01)
*G06Q 10/00* (2012.01)
*B64F 5/60* (2017.01)

(56) References Cited

U.S. PATENT DOCUMENTS

| | | |
|---|---|---|
| 2006/0126608 A1 | 6/2006 | Pereira et al. |
| 2007/0198215 A1* | 8/2007 | Bonanni ............ G05B 23/0251 702/183 |
| 2008/0234979 A1 | 9/2008 | Costiner et al. |

OTHER PUBLICATIONS

International Search Report dated Oct. 29, 2013 in PCT/FR13/051306 Filed Jun. 7, 2013.
French Search Report dated May 14, 2013 in French Application 1255384 Filed Jun. 8, 2012.

* cited by examiner

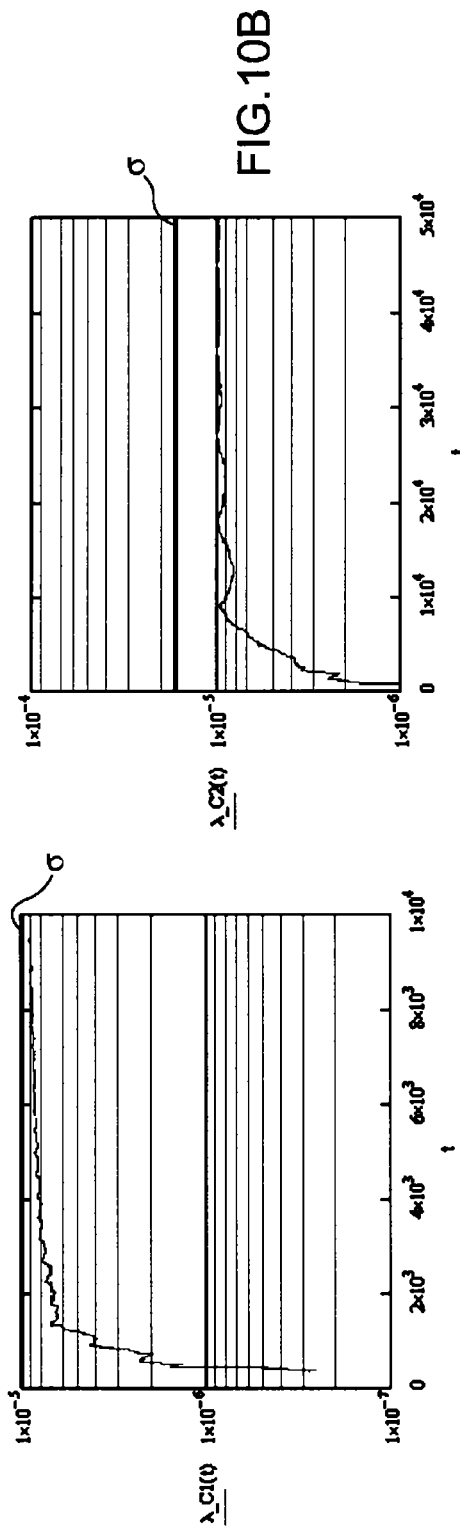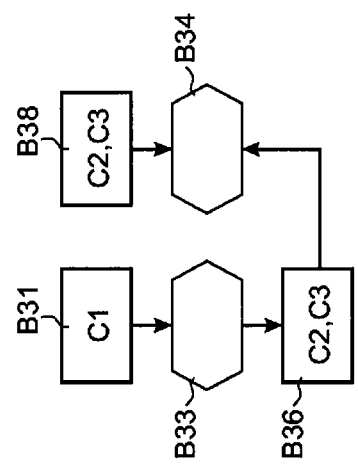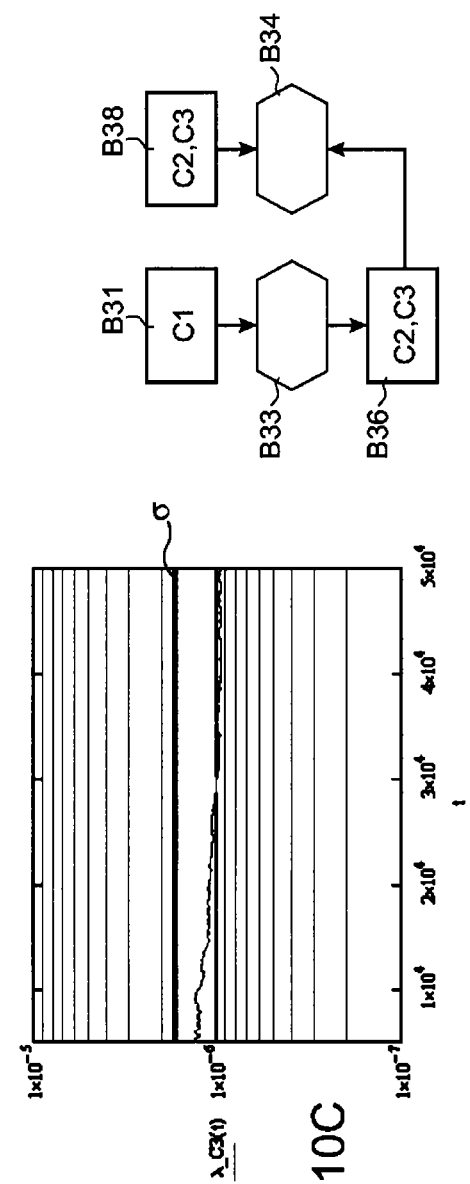

FORECASTING MAINTENANCE OPERATIONS TO BE APPLIED TO AN ENGINE

FIELD OF THE INVENTION

The present invention relates to the field of the maintenance of an engine. In particular, the invention relates to a method and a system for optimizing forecasting of maintenance operations to be applied to an engine which can be for example that of an aircraft.

Generally, the maintenance consists in directly intervening on the engine as a function of the failure cause, without having to deal with other parameters. For example, if an oil leak has been detected, an action is taken on the oil circuit and so on.

However, a maintenance operation on an engine can require a long down time period and high material and labour costs.

Therefore, in order to plan maintenance operations, the experience feedback built up by repairers in workshops on the failure causes is exploited to draw statistical failure curves based on Weibull laws. The tool currently used consists in using the experience feedback and Weibull laws to assign a lifetime to each component of the engine in order to make a risk analysis. This analysis enables the risk to be evaluated for a component to reach an advanced degradation condition. Thus, for each component is defined a regular inspection period for this risk to be lower than a regulatory safety threshold.

However, when an inspection is triggered on a particular component, it is not very likely that the operator will not inspect the component which is very close and especially if the latter is readily accessible. Thus, in reality, far more inspections are made than is demanded by regulation. This generates an increase in the maintenance cost and down time periods. Furthermore, this can cause a lack of accuracy in forecasting maintenance operations and inventory management.

The object of the present invention is consequently to accurately and optimally plan maintenance operations on an engine while fulfilling all the safety requirements and constraints.

OBJECT AND SUMMARY OF THE INVENTION

The present invention relates to a method for forecasting maintenance operations to be applied to an engine or a part of the engine including a set of components, characterised in that it includes the following steps:
building a lifetime model for each component of said set of components,
analysing the lifetime model associated with each component to build a set of failure models corresponding to said set of components, each component being associated with a failure model defining an inter-inspection interval reflecting an advanced degradation risk rate lower than a predetermined safety threshold,
defining a maintenance strategy comprising opportunistic inspections on said set of components,
iteratively simulating maintenance actions on said set of components by using said set of failure models and said maintenance strategy to build a global model of relaxed maintenance operations which takes the opportunistic inspections into account while fulfilling the predetermined safety threshold of each component.

The global model of relaxed maintenance operations enables the impact of the opportunistic inspections on the supplies to be controlled and the inspection plans to be calibrated for a fleet of engines. This in particular enables the number of removals, the uncertainty of the forecasts as well as the intervention costs during the removals to be minimised while fulfilling safety requirements.

Advantageously, each iteration of said simulation includes the following steps:
modifying at least one inter-inspection interval corresponding to at least one component by taking the opportunistic inspections into account to build a current maintenance model,
comparing the risk rate associated with each component according to said current maintenance model with said predetermined safety threshold of said component according to the failure models, and
continuing the simulation until the current maintenance model converges on a last current maintenance model which maximizes the inter-inspection intervals of the components while fulfilling the predetermined safety threshold of each component, said last current maintenance model being said global model of relaxed maintenance of operations.

This enables the set of maintenance rules and degradations to be stochastically simulated while simply checking if there has been a drift with respect to the initial maintenance according to the failure models. Thus, the opportunistic inspections can be taken into account (which would not be taken into account when a risk analysis is made component by component) while preserving all the safety rules.

Advantageously, the method further includes defining a behaviour model of the engine comprising behaviour data from the following data set: mean running time of the engine, mean duration of the missions, number of missions per day, engine age, and maintenances already performed on the engine.

This information is useful to initialize the aging simulation of the components and to refine the calendar forecasts.

Advantageously, the method further includes determining calendar forecasts of the maintenance actions to be applied to said engine by taking said behaviour model of the engine into account.

This enables inventory management for spare parts to be optimized.

Advantageously, building a lifetime model for a given component includes the following steps:
determining a first law of a first transit time $t_{D/S}$ from a safe condition to an intermediate degradation condition of said component,
determining a second law of a second transit time $t_{EO/S}$ from a safe condition to an advanced degradation condition of said component, and
using said first and second laws to assess a third law of a third transit time $t_{EO/D}$ from the intermediate degradation condition to said advanced degradation condition of said component, said third law being assessed according to a strong dependency association law between said first and second laws if the latter two are dependent; and said third law being assessed according to a minimum information dependence association law if said first and second laws are independent, with the proviso that the first transit time is shorter than the second transit time.

This enables a robust law of the transit time from the intermediate degradation condition to the advanced degradation condition to be assessed by taking the dependency or independency of the degradation phenomena between the different conditions into account.

Advantageously, building a lifetime model includes the following steps:
- simulating a sample of numbers $\alpha_i$ evenly distributed on an interval [0; 1],
- calculating first quantiles $q_{D/S}(\alpha_i)$ and second quantiles $q_{EO/S}(\alpha_i)$ of level $\alpha_i$ of said first and second laws respectively, and
- assessing said third law as a function of said first and second quantiles.

This enables a sample of the first law and a sample of the second law to be simulated and a consistent association between the first and second transit times to be made.

According to a first approach, if said first and second laws are dependent, the third law is assessed according to quantiles $q_{EO/D}(\alpha_i)$ equal to the difference between the first $q_{D/S}(\alpha_i)$ and second $q_{EO/S}(\alpha_i)$ quantiles of said first and second laws.

This is a consistent and robust representation of the case where the phenomenon which causes the transition from the safe condition to the intermediate degradation condition is the same as that which causes the transition from the intermediate degradation condition to the advanced degradation condition.

According to a second approach, if said first and second laws are independent, the assessment of the third law includes the following steps:
- associating transit durations of the first $q_{D/S}(\alpha_i)$ and second $q_{EO/S}(\alpha_k)$ quantiles, by ensuring an independency between them with the proviso that the first transit time $t_{D/S}$ is shorter than the second transit time $t_{EO/S}$, and
- assessing the third law according to a duration sample determined by subtracting said transit durations of the first $q_{D/S}(\alpha_i)$ and second $q_{EO/S}(\alpha_k)$ quantiles associated between them.

This enables the independence notion between the phenomenon which causes the transition from the safe condition to the intermediate degradation condition and that which causes the transition from the intermediate degradation condition to the advanced degradation condition to be maximized.

Advantageously, the method according to any of the above characteristics is used for a fleet of aircraft engines.

The invention is also aimed at a system for forecasting maintenance operations to be applied to an engine or a part of the engine including a set of components, characterised in that it includes:
- processing means for building a lifetime model for each component of said set of components,
- processing means for analysing the lifetime model associated with each component in order to build a set of failure models corresponding to said set of components, each component being associated with a failure model defining an inter-inspection interval reflecting an advanced degradation risk rate lower than a predetermined safety threshold,
- processing means for defining a maintenance strategy comprising opportunistic inspections on said set of components,
- processing means for iteratively simulating maintenance actions on said set of components by using said set of failure models and said maintenance strategy in order to build a global model of relaxed maintenance operations which takes the opportunistic inspections into account while fulfilling the predetermined safety threshold of each component.

BRIEF DESCRIPTION OF THE DRAWINGS

Further features and advantages of the device and method according to the invention will better appear upon reading the description made hereinafter, by way of indicating but in no way limiting purposes, in reference to the appended drawings wherein:

FIG. 9 illustrates the structure of a process of opportunistic inspections for the three components of FIG. 7;

FIGS. 10A-10C represent the graphs of the failure models for the three components of FIG. 7;

DETAILED DESCRIPTION OF EMBODIMENTS

The principle of the invention consists in better exploiting at best the interdependency between the inspections to optimize the maintenance plan of a fleet of engines. Thus, by taking the opportunistic inspections into account, it is possible to increase the inter-inspection periods or intervals while remaining consistent with the safety requirements.

Figure 1:
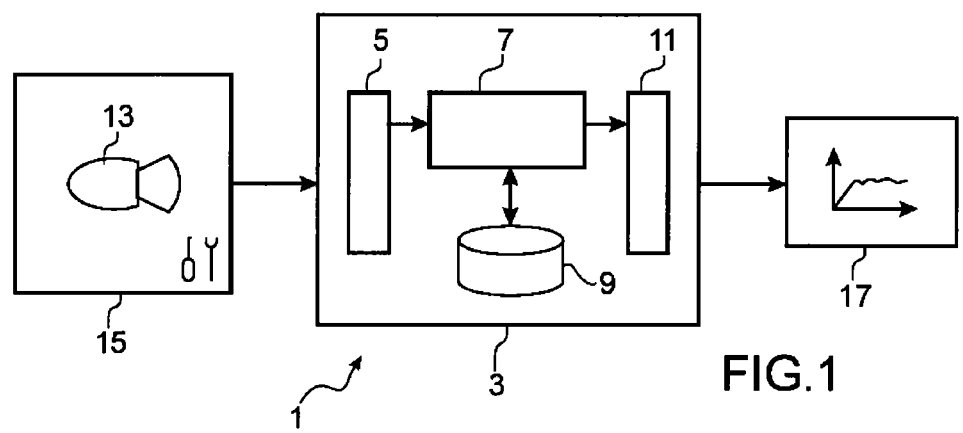
FIG. 1 schematically illustrates a system for forecasting maintenance operations to be applied to an engine or a part of an engine according to the invention.

FIG. 1 schematically illustrates a system for forecasting maintenance operations to be applied to an engine or a part of an engine according to the invention.

The forecasting system 1 includes a computer system 3 usually comprising input means 5, processing means 7, storage means 9, and output means 11. It will be noted that the storage means 9 can include a computer program comprising code instructions suitable for implementing the forecasting method according to the invention. This computer program can be run by the processing means 7 in connection with the storage means 9 and the input 5 and output 11 means.

It will be noted that the system and method are applicable to any engine type intended to perform a work from heat, electrical, chemical energy or other. In the case described hereinafter, the forecasting of maintenance operations to be applied to an aircraft engine including a plurality of components will be more particularly described.

When aircraft engines 13 come to workshops 15, the repairers build up experience on failures and intervention levels of the different components. In particular, the experience feedback data on a whole fleet of engines 13 can include the degradation condition (intermediate or advanced) of each component, the causes of these degradations, the ages of the inspected components (safe and faulty), the operating environment of each engine, the operational condition of each engine, etc.

This experience feedback is exploited by the forecasting system 1 for building MDDV lifetime models. Indeed, the processing means 7 are configured to receive via the input means 5 the different data coming from experience feedback from the different workshops 15 and to exploit them in order to build a lifetime model for each component of the set of components of the engine 13.

Figure 8A:
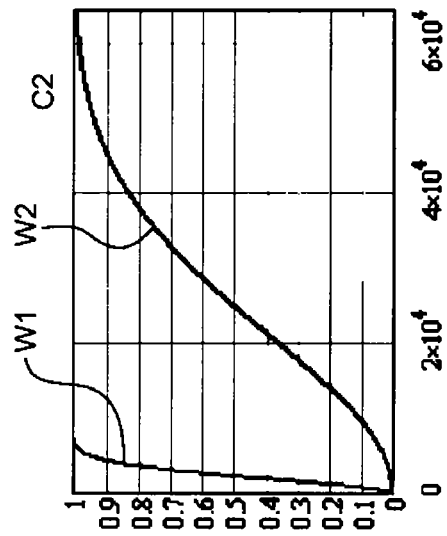
FIGS. 8A-8C represent the graphs of Weibull laws for the three components of FIG. 7.
Figure 8B:
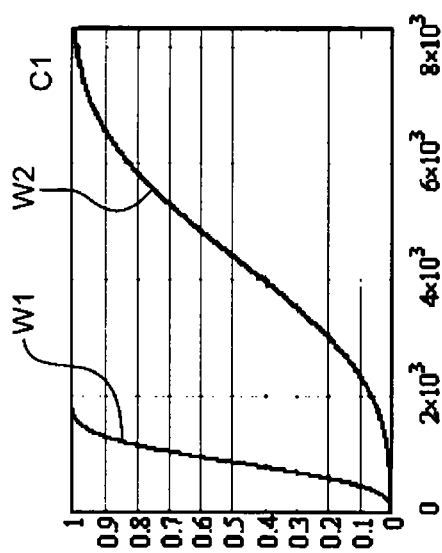
Figure 8C:
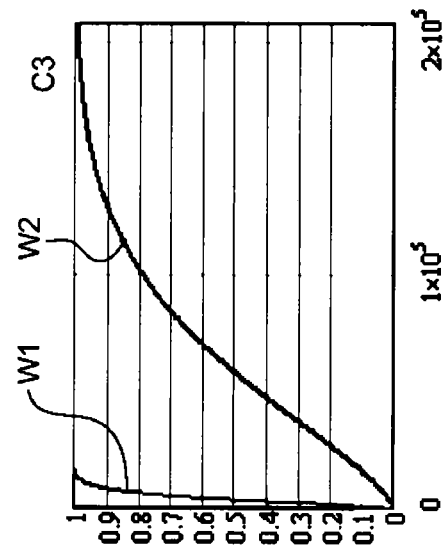

Each lifetime model can be defined by distribution functions of transit times relating to degradation conditions visited by a component during its operational life (refer for example to FIGS. 8A-8C). Each distribution function can be modelled by a cumulative probability curve of lifetime based for example on a Weibull law of distribution. The distribution function $F_{\beta,\eta}$ of a Weibull distribution can be expressed according to the simplified following formula:

$$F_{\beta,\eta} = 1 - e^{-\left(\frac{t}{\eta}\right)^{\beta}}$$

This Weibull distribution is extremely flexible by virtue of taking a shape parameter $\beta$ and a scale parameter $\eta$ into account.

The processing means 7 are further configured to analyse the lifetime model associated with each component in order to build a set of failure models corresponding to the set of components, each component being associated with a failure model defining an inter-inspection interval. The inter-inspection time or interval of a given component reflects an advanced degradation risk level or rate lower than a predetermined safety threshold.

It will be noted that the different lifetime models as well as the set of failure models could be recorded in the storage means 9 and optionally displayed on viewing means 17 connected to the output means 11.

Further, the storage means 9 are configured to contain maintenance plans including opportunistic inspections on the different components. More particularly, the processing means 7 in connection with the storage means 9 are configured to define a maintenance plan or strategy on the set of components, comprising opportunistic maintenance inspections or actions. Thus, an inspection programmed for one or more components can cause a number of opportunistic inspections on other components (see FIG. 5).

In accordance with the invention, the processing means 7 are configured to iteratively simulate maintenance actions on the set of components by using the set of failure models and the maintenance strategy to build a global model of relaxed maintenance operations which takes the opportunistic inspections into account while fulfilling the predetermined safety threshold of each component. The conditions visited by the set of components can be simulated by taking the maintenance strategy into account, according to a Petri network type Monte Carlo method. Thus, starting from an initial condition, the simulation can be recursively defined by re-evaluating at each iteration the advanced degradation risk rates generating step by step increasingly relaxed inter-inspection intervals.

FIGS. 2-6 are flow diagrams illustrating the method for forecasting maintenance operations on an engine according to the invention.

Figure 2:
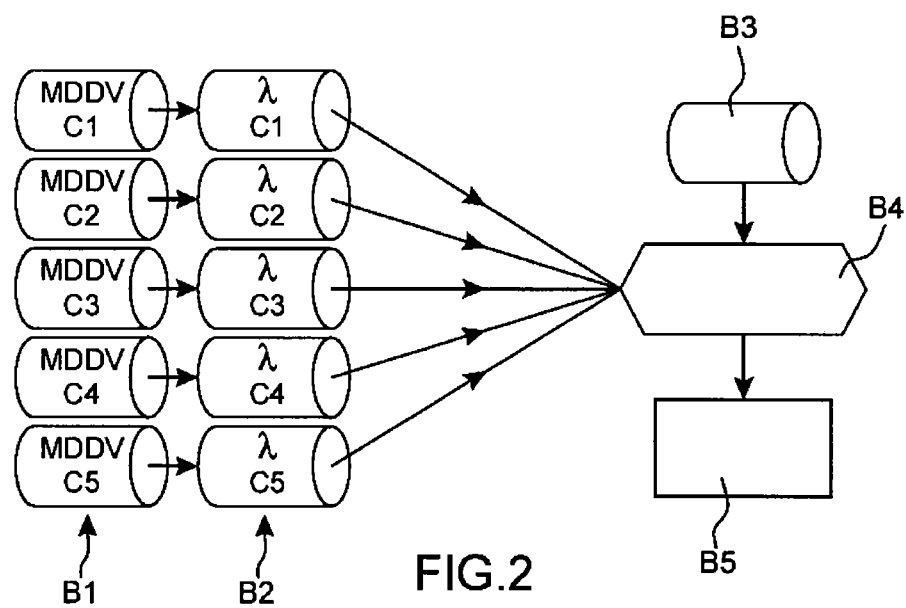
FIG. 2 is logic block diagram illustrating a preferred embodiment of the method for forecasting maintenance operations on an engine, according to the invention.

More particularly, FIG. 2 is a logic block diagram illustrating a preferred embodiment of the method for forecasting maintenance operations on an engine, according to the invention.

In blocks B1, the MDDV lifetime models are built for the set of components.

Figure 3A:
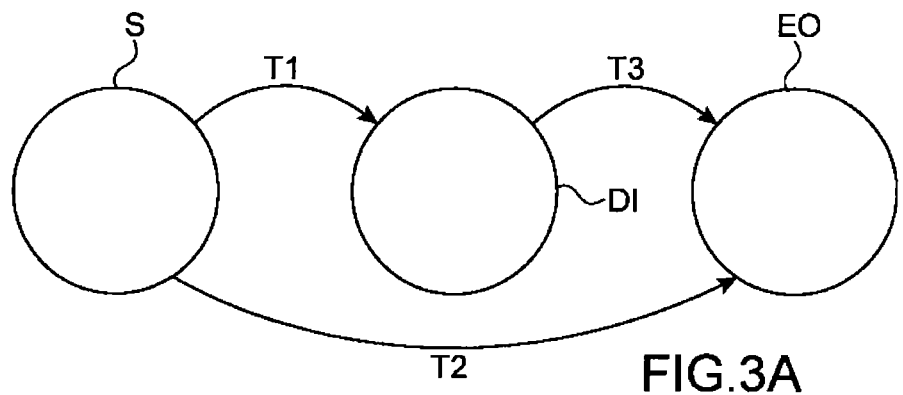
FIG. 3A is a Markov type graph modelling a failure scenario of a component between different conditions.
Figure 3B:
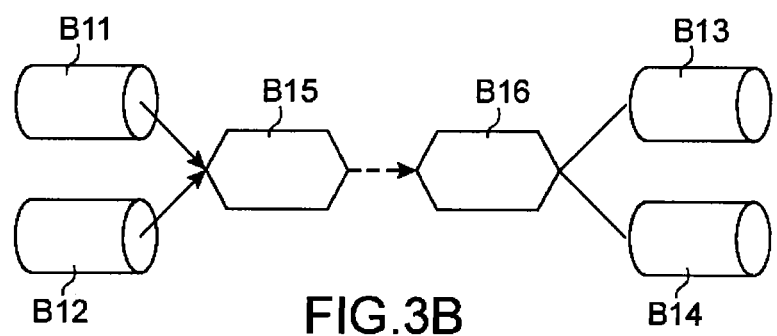
FIG. 3B illustrates the determination of the first and second transit laws, according to the invention.
Figure 3C:
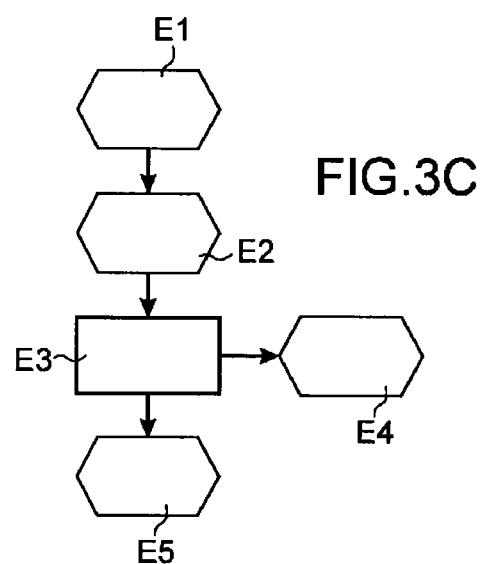
FIG. 3C is a flow diagram illustrating the determination of a third transit law from the first and second laws, according to the invention.

FIGS. 3A-3C explain with more details the building of the lifetime model for a component.

FIG. 3A is a Markov type graph modelling a failure scenario of a component between different conditions.

The failure process of a component is defined in discrete space of conditions consisting of three conditions: a safe condition S, an intermediate degradation condition DI, and an advanced degradation condition that can result in an operational event EO. The graph shows that the component visits two successive degradation conditions during its operational life. The first of these degradation (intermediate degradation DI) conditions is a degradation transitory condition detectable during an inspection and the last condition (advanced degradation) resulting in an operational event EO. The graph is modelled such that the advanced degradation condition EO is accessible from the safe condition S as well as from the intermediate degradation condition DI which itself is only accessible from the safe condition S.

The building of a lifetime model of a component then includes assessing transition laws between the different conditions. A first condition law (represented by the arrow T1) is associated with a transition time $t_{D/S}$ from a safe condition S to an intermediate degradation condition DI (also called the intermediate degradation lifetime DVDI); a second transition law (arrow T2) is associated with a transition time $t_{EO/S}$ from a safe condition S to an advanced degradation condition EO (also called the advanced degradation lifetime DVEO); and a third transition law (arrow T3) is associated with a transition time $t_{EO/D}$ from the intermediate degradation condition DI to the advanced degradation condition EO.

FIG. 3B illustrates the determination of the first and second transition laws.

It will be noted that in the running phase of the engines, the results of inspections of the components for example the operation time and the degradation condition of each inspected component are known. On the other hand, very rare in-flight operational events attributable to damage of a component via too advanced a degradation are known. These observation or experience feedback data enable the first and second transition laws to be determined.

Thus, Weibull or Log-Normal transition laws can be determined from the observation data stored in the storage means 9.

More particularly, block B11 represents first observation data comprising the ages of the inspected safe components. Block B12 represents second observation data comprising the ages of inspected degraded components. Block B13 represents third observation data comprising the ages of components in use. Block B14 represents fourth observation data comprising the ages of components during an operational event.

In block B15, the processing means 7 are configured to determine for a given component, the first transition time law $t_{D/S}$ from a safe condition S to an intermediate degradation condition DI. The parameters of this first DVDI intermediate degradation lifetime law can be assessed according to a maximum likelihood type statistical method in view of the observation data of blocks B11 and B12.

Likewise, in block B16, the processing means 7 are configured to determine for a given component, the second transition time law $t_{EO/S}$ from a safe condition S to an advanced degradation condition EO. The parameters of this second advanced degradation lifetime law DVEO can also be assessed in principle according to the maximum likelihood method in view of the observation data of blocks B13 and B14. However, the rarity of the observation data of block B14 makes the direct assessment of the second law very inaccurate. Thus, the dotted arrow between blocks B15 and B16 shows that it is often required to rely on the assessment of the first law to assess the second law. Above all, information about the dispersion is recovered by hypothesising that the dispersion of the second DVEO law is the same as that observed on the first DVDI law.

However, the transition from the intermediate degradation condition DI to the advanced degradation condition EO is almost never observed. Indeed, when the intermediate degradation condition DI of a component can be seen, the component or degraded part(s) of the component is (are) replaced before resuming engine running.

Since the third transition law is not directly accessible via the experience feedback, it can advantageously be deduced from the first and second laws via a law separation process illustrated by the flow diagram of FIG. 3C.

According to a first approach (see step E4), the third law is assessed according to a strong dependency association law between the first and second laws if the latter are dependent.

According to a second approach (see step E5), the third law is assessed according to a minimum information dependence association law if the first and second laws are independent, with the proviso that the DVDI first transition time is shorter than the DVEO second transition time.

Steps E1 and E2 are common to both approaches.

In step E1, a sample of numbers $\alpha_i$ evenly distributed on an interval [0; 1] is simulated. Each draw can be made by a random number generator and the sample size can for example be in the order of $10^5$ draws.

In step E2, a first quantile $q_{D/S}(\alpha_i)$ of level $\alpha_i$ relating to the first intermediate degradation law and a second quantile $q_{EO/S}(\alpha_i)$ of level $\alpha_i$ relating to the second advanced degradation law are calculated. The first quantile $q_{D/S}(\alpha_i)$ is relating to the DVDI intermediate degradation lifetime and the second quantile $q_{EO/S}(\alpha_i)$ is relating to the DVEO advanced degradation lifetime. It will be noted that a quantile $q(\alpha)$ of a random variable X holds the probability $P(X<q(\alpha))=\alpha$. In other words, the quantile is a point of the original law which, when composed with the distribution function (Weibull law) gives a point between 0 and 1 which is exactly equal to a. Thus, to simulate the third law, it is sufficient to do the opposite.

Step E3 is to select either a dependence approach, or an interdependency approach between the first and second laws. It is an input hypothesis in modelling which depends on the nature of the degradation phenomena.

If the phenomenon which causes the transition from the safe condition to the intermediate degradation condition is the same as that which causes the transition from the intermediate degradation condition to the advanced degradation condition, then it can be considered that the first and second laws are dependent. For example, there can be a same bias which causes wear of a first coating according to a first time scale involving an intermediate degradation and then wear of a second coating according to a second time scale involving an advanced degradation. In this case, the first and second laws related to the wear phenomenon can be considered as dependent.

However, if the phenomenon which causes transition from the safe condition to the intermediate degradation condition is not the same as that which causes the transition from the intermediate degradation condition to the advanced degradation condition, then it can be considered that the first and second laws are independent. For example, the starting of cracks involving an intermediate degradation does not obey the same kinetics as propagation of cracks which can trigger an operational event. In this case, the first and second laws respectively related to starting and propagation of cracks can be considered as independent. Another example of independency relates to the engine ingesting a foreign body. The impact that can generate an intermediate degradation completely differs from the nature of subsequent phenomena which can cause slowly developing damages that can trigger an operational event.

It will be noted that under a dependence hypothesis, a short transition time from the safe condition S to the inteiinediate degradation condition DI can be for example systematically associated with a short transition time from the intermediate degradation condition DI to the advanced degradation condition EO. On the other hand, under the independency hypothesis, knowing the transition time from the safe condition S to the inteiinediate degradation condition DI does not give any information about the transition time from the intermediate degradation DI to the advanced degradation condition EO.

In the case where the first and second laws are dependent, proceed to step E4, otherwise, proceed to step E5.

In step E4, the first and second laws are considered as dependent. In this case, the third law is assessed according to quantiles $q_{EO/D}(\alpha_i)$ equal to the difference between the first $q_{D/S}(\alpha_i)$ and second $q_{EO/S}(\alpha_i)$ quantiles of the first and second laws. It will be noted that to simulate the third law, it is sufficient to associate the couples of the first $q_{D/S}(\alpha_i)$ and second $q_{EO/S}(\alpha_i)$ quantiles. In another words, it is sufficient to build a sample of couples (DVDI$_i$; DVEO$_i$) associating each intermediate degradation lifetime DVDI$_i$ with a corresponding advanced degradation lifetime DVEO$_i$.

In step E5, since the first and second laws are considered as independent, the transition durations of the first $q_{D/S}(\alpha_i)$ and second $q_{EO/S}(\alpha_k)$ quantiles are associated (that is, forming couples (DVDI$_i$; DVEO$_k$), by ensuring an independency between them with the proviso that the first transition time $t_{D/S}$ is shorter than a second transition time $t_{EO/D}$ (that is, DVDI$_i$<DVEO$_k$). An example of such an association is illustrated in FIG. 3D.

It will be noted that this association between the first $q_{D/S}(\alpha_i)$ and second $q_{EO/S}(\alpha_k)$ quantiles is sufficient to simulate the third law.

However, in step E5, the third law can be assessed according to a sample of lifetimes, deteteimined by subtracting the transition times of the corresponding first $q_{D/S}(\alpha_i)$ and second $q_{EO/S}(\alpha_k)$ quantiles.

Figure 3D:
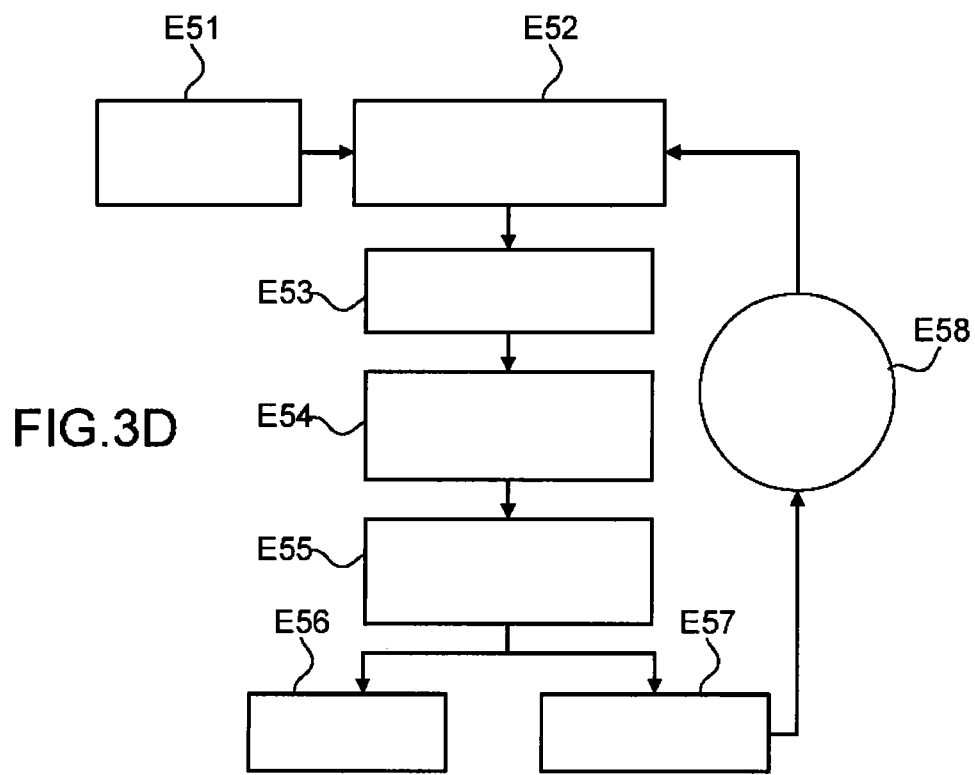
FIG. 3D is a flow diagram illustrating an example of association of the intermediate degradation and advanced degradation lifetimes in the case where the first and second laws are independent, according to the invention.

FIG. 3D is a flow diagram illustrating an example of association of the DVDI intermediate degradation and DVEO advanced degradation lifetimes in the case where the first and second laws are independent.

Here, the object is to simulate couples (DVDI; DVEO) of intermediate degradation DVDI and advanced degradation DVEO lifetimes with the proviso of a minimum dependency, that is by injecting minimum information about the link between both these variables other than the stochastic order. In other words, the object is to ensure the best independency level with the proviso of the following inequality: DVDI<DVEO.

In step E51, the processing means 7 simulate a sample of the DVDI variable and a sample of the DVEO variable of the same size N and such that for each $DVDI_i$ value, a $DVEO_i$ value can be found fulfilling the stochastic order $DVDI_i<DVEO_i$. Thus, there is a list $S=(DVDI_i; DVEO_i)$ of couples, such that all the associations $(DVDI_i; DVEO_i)$ are compatible, that is fulfil the stochastic order. It will be noted that step E51 is the same as steps E1 and E2 of FIG. 3C. In other words, in step E51, a sample of couples simulated by the flow diagram of FIG. 3C is recovered.

In step E52, the processing means 7 separate the couples $(DVDI_i; DVEO_i)$ defined in the previous step into two compatible vectors of the same size N: a first vector X for the simulated DVDI intermediate degradation lifetimes and a second vector Y for the simulated DVEO advanced degradation lifetimes. In other words, the first vector corresponds to the transition duration of the first quantiles $X=q_{DI/S}(\alpha_i)$ and the second vector corresponds to the transition durations of the second quantiles $Y=q_{EO/S}(\alpha_i)$.

Steps E53-E55 consist in generating new couples fulfilling the stochastic order.

More particularly, the processing means 7 select in step E53, the greatest value of intermediate degradation lifetime $Max(DVDI_i)$ in the vector X. This greatest DVDI intermediate degradation lifetime is noted $x=Max(DVDI_i)$.

In step E54, the processing means 7 select a sub-vector $Y_{sup(x)}$ of DVEO advanced degradation lifetime each element of which has a lifetime higher than x. Thus, all the elements of the sub-vector $Y_{sup(x)}$ are potential candidates for being associated to x because they fulfil the stochastic order constraint.

Thus, in step E55, the processing means 7 select an element y of $Y_{sup(x)}$ according to a uniform random selection.

In step E56, the processing means 7 associate the element x of the vector X to the element y of the sub-vector $Y_{sup(x)}$ to form the couple (x; y).

In step E57, the processing means 7 store this couple in the storage means 9.

In step E58, the processing means 7 suppress the elements x and y belonging to the vectors X and Y respectively.

In step E59, the processing means 7 loop back the step E52 to start again steps E52-E58 up to N iterations. Thus, step by step, all the elements of vectors X and Y compatible with the stochastic order come to be associated by injecting minimum information. This way of creating disturbances enables the entropy to be increased and thus a best independency level to be ensured between variables DVI and DVEO.

Coming back to FIG. 2, after having built in blocks B1 the lifetime models for the set of components, the processing means 7 build in blocks B2 the set of failure models corresponding to the set of components.

Figure 4A:
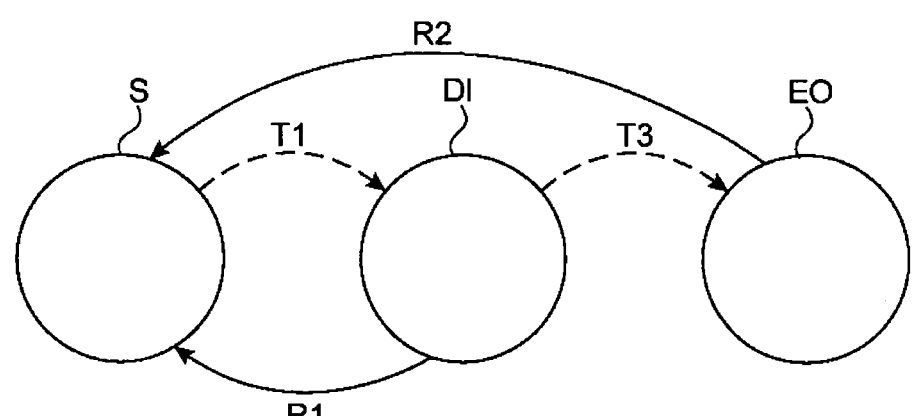
FIGS. 4A and 4B explain the building of a failure model corresponding to a component, according to the invention.
Figure 4B:
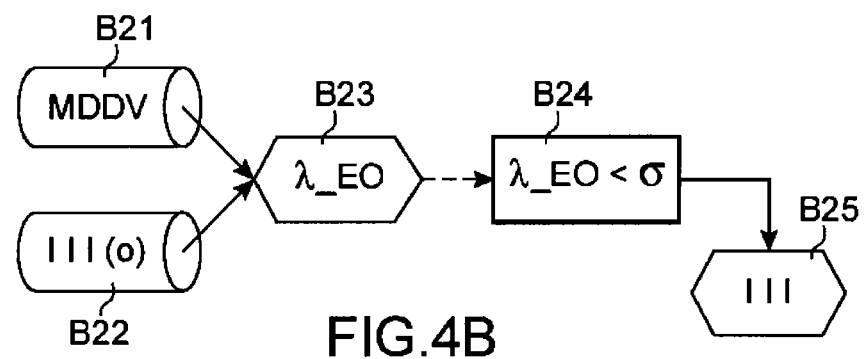

FIGS. 4A and 4B explain in more details the building of a failure model corresponding to a component.

FIG. 4A is a Markov type graph modelling the maintenance strategy for a component.

The component is inspected at a regular time interval $t_{insp}$, called an inter-inspection interval III, and replaced upon noticing a degradation. Thus, a first back arrow R1 from the intermediate degradation condition DI to the safe condition S indicates the replacement of the component upon detecting a degradation during the inspection. A second back arrow R2 from the advanced degradation condition EO to the safe condition S indicates the replacement of the component subsequent to an operational event.

The purpose of the failure model is to calibrate by iteration the inter-inspection interval III such that the advanced degradation risk rate is lower than a predetermined safety threshold.

Indeed, FIG. 4B illustrates the process of building a failure model for a component.

From the MDDV lifetime model associated with the component (block B21) and an initial III(0) or current (block B22) inter-inspection interval, the processing means 7 calculate in block B23 the advanced degradation risk rate λ. It will be noted that this risk rate λ is an occurrence rate of operational events EO (that is, the number of cumulative operational events divided by the number of flights).

In block B24, the processing means 7 compare the advanced degradation risk rate λ to a predetermined safety threshold σ. For more safety, the threshold σ corresponds to some percentage α % of a regulatory safety threshold. If the risk rate λ is not lower than the threshold σ, then the processing means 7 reiterate on the value of the inter-inspection interval III by looping on block B22. On the other hand, if the risk level λ, is lower than the threshold σ, then in block B25, the processing means 7 store the last value of the inter-inspection interval III in the storage means 9. The purpose herein is to search for the greatest value of the inter-inspection interval III which fulfils the safety criterion of block B24.

However, the inter-inspection interval III determined according to the process of FIG. 4B is unique to each component and does not take the opportunistic inspections into account.

Consequently, in order to take the opportunistic inspections into account, the processing means 7 use in block B3 (see FIG. 2) a maintenance strategy involving opportunistic maintenance actions on the set of components.

Figure 5:
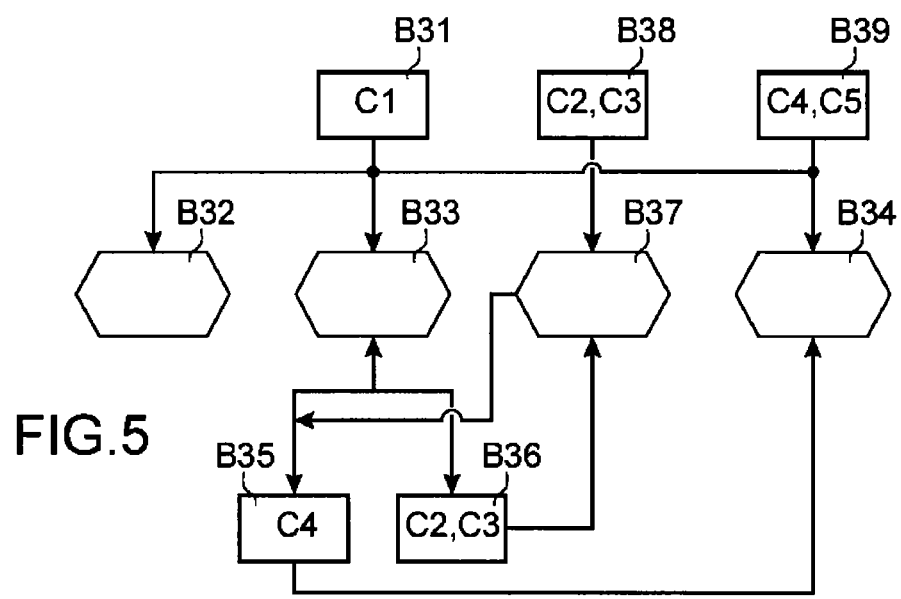
FIG. 5 illustrates the structure of a process of opportunistic inspections, according to the invention.

FIG. 5 illustrates the structure of a process of opportunistic inspections for a few components.

This example illustrates a maintenance strategy involving five components C1 to C5.

In block B31, a first inspection is programmed at the component C1. This inspection can lead to a first very light maintenance (block B32), a second light maintenance (block B33), or a third heavy maintenance (block B34).

The first very light maintenance (block B32) has no consequence on the other components of the engine in terms of inspections or maintenance.

The second light maintenance (block B33) requires the replacement of components C1 and involves an opportunistic inspection of component C4 (block B35) as well as opportunistic inspections of components C2 and C3 (block B36).

In case where it is observed that component C4 is degraded, the strategy is modified and a heavy maintenance (block B34) is started which could involve sending the engine to the workshop to inspect for example all the components.

On the other hand, if it is observed that at least one of both components C2 and C3 is degraded, a medium maintenance (block B37) will be started which will result in the inspection of component C4 (block B35).

Further, in block B38, a second inspection is programmed at components C2 and C3. In case of degradation of one of both components, this second inspection systematically leads to a medium maintenance (block B37) involving the inspection of component C4 (block B35). Possibly, the same path as previously is performed which leads to a heavy maintenance (block B34).

Finally, in block B39, a third inspection is programmed at components C4 and C5. In case of degradation of one of both components, this third inspection systematically leads to a heavy maintenance (block B34).

The example of FIG. 5 shows that the inspections programmed cause a number of opportunistic inspections on other components as a function of the nature of the components and their conditions (safe or degraded), and which in turn lead to an enhancement of the engine maintenance. Consequently, the maintenance program initially coming from risk analyses at single components could be largely reduced in view of the global maintenance strategy on the entire engine while fulfilling the safety criteria.

Thus, in block B4 (see FIG. 2), the processing means 7 iteratively simulate maintenance actions on all the set of components by using the set of failure models (blocks B2) and the maintenance strategy (block B3) to relax the initial inter-inspection intervals III such that maintenance actually applied at the components coincides with the maintenance initially defined during risk analyses per component.

Figure 6:
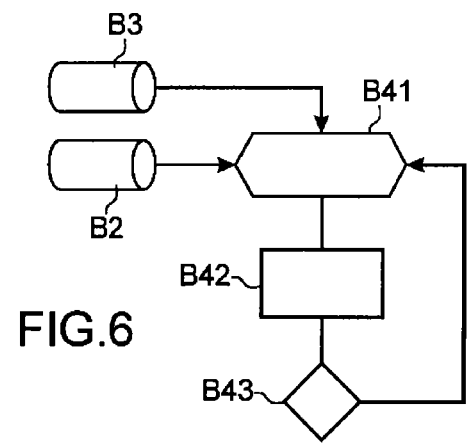
FIG. 6 illustrates important steps of simulating maintenance actions of a set of components, according to the invention.

FIG. 6 illustrates important steps of simulating maintenance actions on the set of components.

More particularly, in block B41, the processing means 7 at least modify an inter-inspection interval III corresponding to at least one component by taking opportunistic maintenance actions (block B3) into account to build a current maintenance model (block B42).

In block B43, the processing means 7 compare the risk rate associated with each component according to the current maintenance model B42 with the predetermined safety threshold of the component according to the failure models from block B2.

As long as the safety criterion of block B43 is fulfilled, the processing means 7 continue simulating by looping on block B41 until the current maintenance model converges on a last current maintenance model which maximizes the inter-inspection intervals III of the components while fulfilling the predetermined safety threshold of each component. The last current maintenance model which corresponds to the global model of relaxed maintenance operations is stored in the storage means 9. It is an optimum solution in terms of minimizing maintenance costs while fulfilling the safety requirements of the flights.

Figure 7:
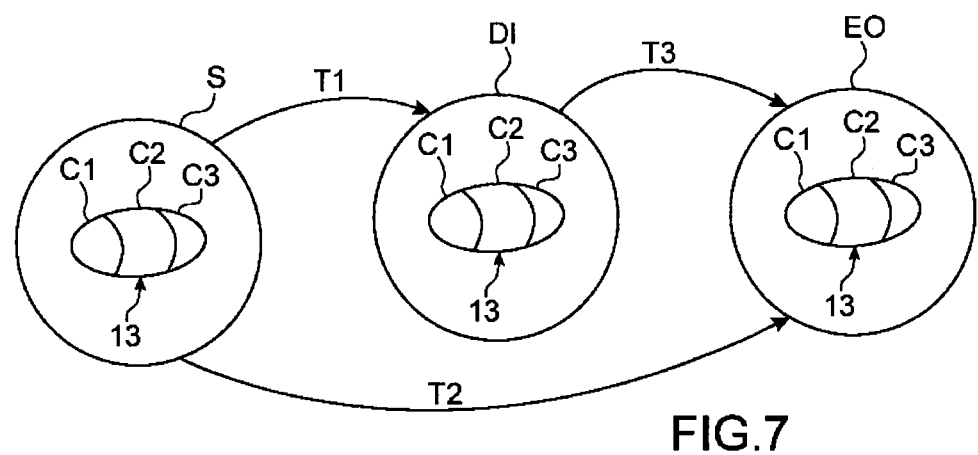
FIG. 7 is an exemplary system including three components enabling the method for forecasting maintenance operations to be explained in more details.

FIG. 7 is an example of a system including only three components enabling the method of forecasting maintenance operations to be explained in more details.

The system 13 represents an engine or a part of an engine made of three components C1, C2 and C3. These three components which originally are in a safe condition S can optionally visit during their operational life, two successive degradation conditions (intermediate degradation DI and advanced degradation EO) according to the Markov type graph.

The distribution function of the transition times from the safe condition S to a higher level degradation condition is that of a Weibull law:

$$F_{\beta,\eta} = 1 - e^{-\left(\frac{t}{\eta}\right)^\beta}$$

Each of the three components C1, C2, and C3 has a distribution function available from the safe condition S to the intermediate degradation condition DI and from the safe condition S to the advanced degradation condition EO.

By way of example, the table below gives the parameters of the Weibull law for the three components C1, C2, and C3:

|        | C1   | C2    | C3    |
|--------|------|-------|-------|
| beta   | 3    | 2     | 1.5   |
| eta_DI | 1000 | 3000  | 5000  |
| eta_EO | 5000 | 30000 | 75000 |

The parameter $\beta$ is a shape parameter which is robust enough because it can be assessed from a great number of data of intermediate degradations DI. Thus, through a Bayesian reasoning, the same value $\beta$ can be taken for the intermediate DI and advanced EO degradations. It will be noted that $\beta>1$ for the three components C1, C2, and C3, which reflects the fact that the older the component, the greater the risk of breakdown.

On the other hand, the parameter $\eta$ is a scale parameter which depends on the medium degradation age and consequently, the same value of $\eta$ cannot be kept both for an intermediate degradation DI and an advanced degradation EO.

FIGS. 8A-8C represent the graphs of the Weibull laws for the three components.

The cumulative probability is represented in ordinate and the number of flights of the engine is represented in abscissa. Each graph represents a first Weibull law W1 relating to the lifetime of an intermediate degradation DVDI and a second Weibull law W2 relating to the lifetime of an advanced degradation DVEO.

Further, a sample of couples of intermediate degradation DVDI and advanced degradation DVEO lifetime can be simulated according for example to the flow diagram of FIG. 3C. Thus, with each component is associated a lifetime model defining the transitions from the safe condition S to the intermediate degradation condition DI, from the safe condition S to the advanced degradation condition EO, and from the intermediate degradation condition DI to the advanced degradation condition EO.

On the other hand, FIG. 9 illustrates the structure of a process of opportunistic inspections for the three components. It will be noted that the structure of the example of FIG. 9 comes partly from that of FIG. 5.

In block B31, a first inspection is programmed at component C1. This inspection leads to a light maintenance (block B33) requiring replacement of component C1 and involves an opportunistic inspection of components C2 and C3 (block B36).

In the case where it is observed that at least one of both components C2 and C3 is degraded, a medium maintenance (block B34) will be started which will lead to the inspection of all the components.

Finally, in block B38, a second inspection is programmed at components C2 and C3. In case of degradation of one of both components, this second inspection systematically leads to a heavy maintenance (block B34).

FIGS. 10A-10C represent the graphs of the failure models for the three components.

The graphs are obtained by a Monte Carlo simulation from the lifetime models of components C1, C2, and C3. The advanced degradation risk rate λ is represented in ordinate and the number of flights of the engine is represented in abscissa. The advanced degradation risk rate λ for each component is lower than the safety threshold σ.

These graphs enable the single inter-inspection intervals III to be defined as well as the tendency of the advanced degradation risk rates 2 for the three components C1, C2, and C3, as indicated in the table below:

|        | C1       | C2       | C3       |
|--------|----------|----------|----------|
| III    | 450      | 900      | 750      |
| Lambda | 1.00E−05 | 1.00E−05 | 1.00E−06 |

Figure 11:
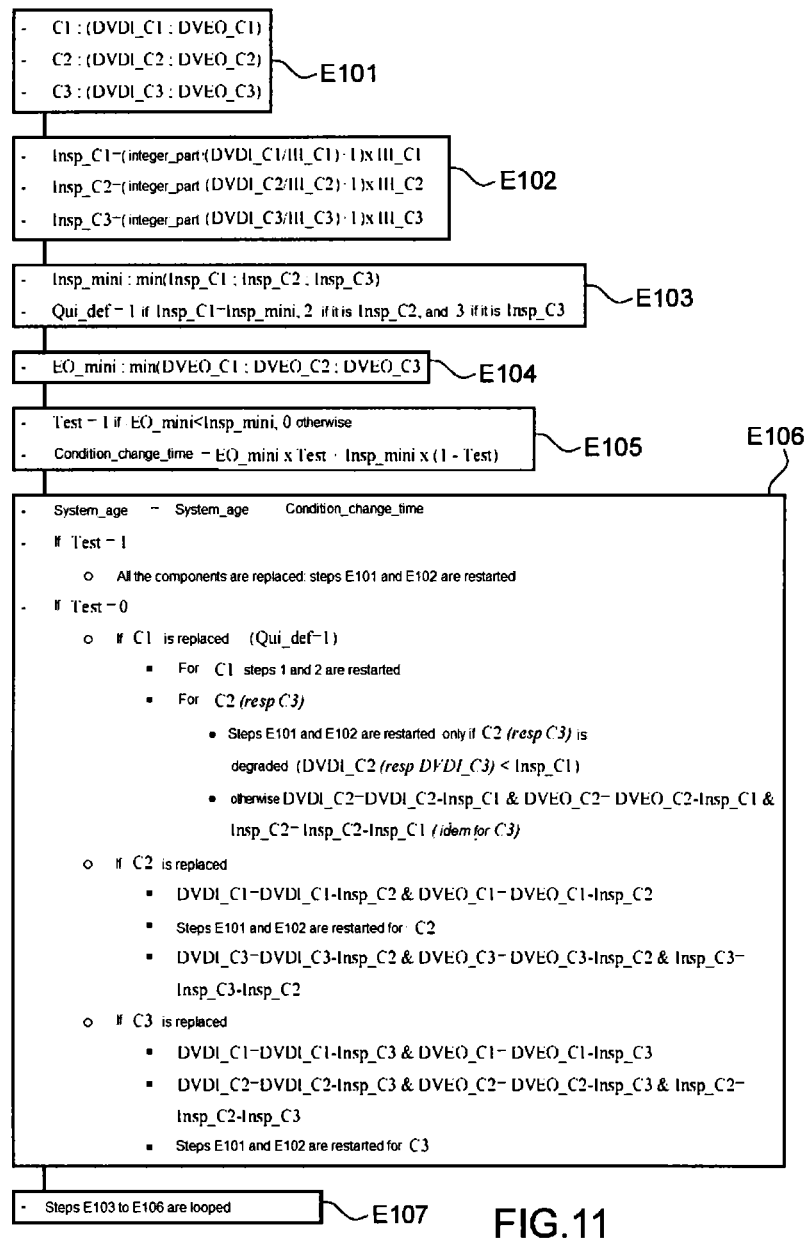
FIG. 11 illustrates an algorithm of simulating the maintenance actions on the three components of FIG. 7.

FIG. 11 illustrates an algorithm of simulating maintenance actions on the three components.

This algorithm simulates the conditions visited by the three components taking opportunistic inspections of the maintenance plan of FIG. 9 into account.

Step E101 relates to the simulation of degradation lifetimes of the three components. For each component, a couple of intermediate degradation DVDI and advanced degradation DVEO is simulated
  C1: (DVDI_C1; DVEO_C1)
  C2: (DVDI_C2; DVEO_C2)
  C3: (DVDI_C3; DVEO_C3)
  In step E102, the processing means 7 determine the time remaining until the inspection detecting the degradation. From the inter-inspection intervals III and the intermediate degradation lifetimes DVDI already simulated, the following time vector is defined:
Insp_C1=(integer_part(DVDI_C1/III_C1)+1)×III_C1
Insp_C2=(integer_part(DVDI_C2/III_C2)+1)×III_C2
Insp_C3=(integer_part(DVDI_C3/III_C3)+1)×III_C3

Thus, Insp_C1 defines the first inspection of C1 just after the degradation. Likewise for Insp_C2 and Insp_C3.

In step E103, the processing means 7 determine the next restoration time of the system which corresponds quite simply to the minimum age of the first inspections simulated in the previous step:
  Insp_mini: min(Insp_C1; Insp_C2; Insp_C3)
  Qui_def=1 if Insp_C1=Insp_mini, 2 if it is Insp_C2, and 3 if it is Insp_C3

The parameter Qui_def indicates which component is to be replaced at the next restoration time.

In step E104, the processing means 7 determine the next advanced degradation time EO which is quite simply the minimum of the advanced degradation lifetimes of the three components:
  EO_mini: min(DVEO_C1; DVEO_C2; DVEO_C3)
  In step E105, the processing means 7 determine the next time of condition change of the system:
Test=1 if EO_mini<Insp_mini, 0 otherwise
Condition_change_time=EO_mini×Test+Insp_mini×(1−Test)

The formula of the second line indicates whether the next condition change is an advanced degradation EO or a restoration Insp.

Thus, in step E105, it is known when the system changes condition and it is also known whether the restoration is due to an advanced degradation EO or an intermediate degradation DI.

Thus, in step E106, an update of the system condition can be performed by taking the maintenance strategy of FIG. 9 into account.

At the beginning, the processing means 7 update the system age which is equal to the age it was before, increased by the condition change time.

If there has been an advanced degradation (Test=1), the maintenance strategy demands the replacement of all the components, and to go back to steps E101 and E102.

On the other hand, if there has been a restoration (Test=0), it is attempted to know which component has been replaced. According to a first case, if component C1 has been replaced, then the processing means 7 restart steps E101 and E102 to simulate again the intermediate degradation DVDI and advanced degradation DVEO lifetimes as well as the times of next inspections. According to a second case (respectively, a third case), if component C2 (resp. C3) has been replaced, then the processing means 7 restart steps E101 and E102 only if C2 (resp. C3) is degraded, which amounts to checking whether the intermediate degradation lifetime of C2 (resp. C3) is lower than the inspection time of C1. Otherwise, that is, if C2 (resp. C3) has been inspected and is not degraded, then the update simply consists in determining the time remaining until the next inspection for C2 (resp. C3) which is equal to the time remaining which has already been stored minus the time of last inspection.

Thus, in step E106, the update of the system condition includes the following sub-steps:
  System_age=System_age+Condition_change_time
  If Test=1
    All the components are replaced: steps E101 and E102 are restarted
  If Test=0
    If C1 is replaced (Qui_def=1)
      For C1 steps 1 and 2 are restarted
      For C2 (resp C3)
        steps E101 and E102 are restarted only if C2 (resp C3) is degraded (DVDI_C2 (resp DVDI_C3) <Insp_C1)
        otherwise   DVDI_C2=DVDI_C2-Insp_C1   &
                    DVEO_C2=DVEO_C2-Insp_C1   &
                    Insp_C2=Insp_C2-Insp_C1 (idem for C3)
    If C2 is replaced
      DVDI_C1=DVDI_C1-Insp_C2                 &
      DVEO_C1=DVEO_C1-Insp_C2
      Steps E101 and E102 are restarted for C2
      DVDI_C3=DVDI_C3-Insp_C2                 &
      DVEO_C3=DVEO_C3-Insp_C2                 &
      Insp_C3=Insp_C3-Insp_C2
    If C3 is replaced
      DVDI_C1=DVDI_C1-Insp_C3                 &
      DVEO_C1=DVEO_C1-Insp_C3
      DVDI_C2=DVDI_C2-Insp_C3                 &
      DVEO_C2=DVEO_C2-Insp_C3                 &
      Insp_C2=Insp_C2-Insp_C3
      Steps E101 and E102 are restarted for C3

In step E107, steps E103 to E106 are looped as long as the system age is lower than a predefined limit which generally corresponds to the system lifetime (in the order of a few tens thousands cycles for an aircraft engine).

Thus, the algorithm enables the evolution of the advanced degradation risk rate to be illustrated according to the maintenance strategy.

Figure 12B:
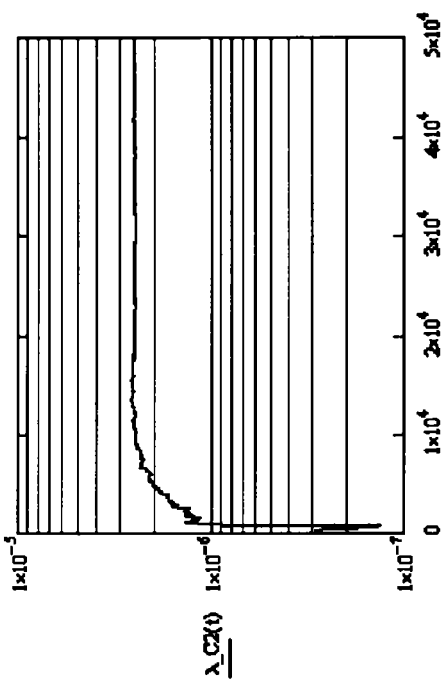
FIGS. 12A-12C represent the graphs of the failure models taking account of the opportunistic inspections for the three components of FIG. 7.
Figure 12A:
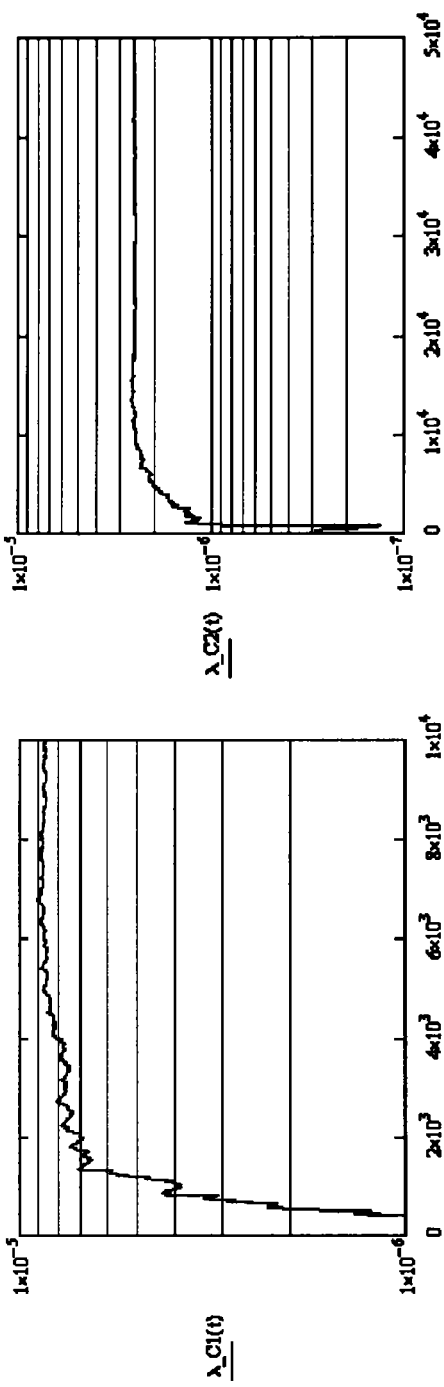
Figure 12C:
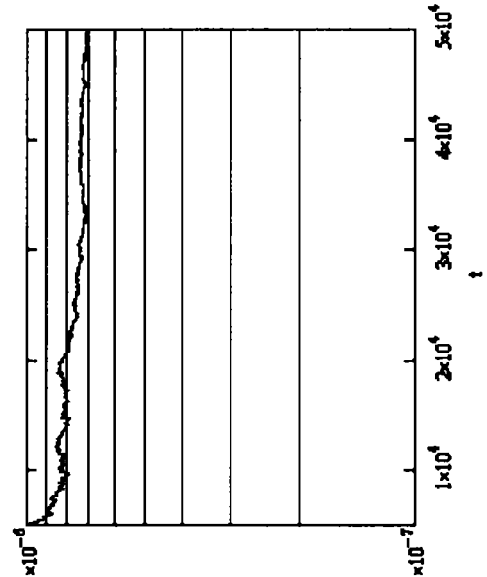

Indeed, FIGS. 12A-12C represent graphs of failure models for the three components by taking opportunistic inspections into account.

These graphs show that the advanced degradation risk rate of component C1 is faintly decreased. On the other hand, for C2 and C3, the advanced degradation risk rates are substantially lower with respect to the graphs of FIGS. 10A-10C.

This enables the inter-inspection intervals III to be widened to find a set of curves of advanced degradation risk rates which is close to that of FIGS. 10A-10C.

From the maintenance strategy of FIG. 5, the influence of the inter-inspection intervals III onto the advanced degradation risk rates can be prognosticated.

The inter-inspection interval III of C1 cannot be changed because it is the only one to have an influence on the advanced degradation risk rate of C1. On the other hand, the inter-inspection interval III of C2 and C3 can be completely independently modified.

Finally, step by step, the simulation performed according to the algorithm of FIG. 11 converges on a global model of relaxed maintenance operations defined by the parameters indicated on the table below:

|        | C1      | C2      | C3      |
|--------|---------|---------|---------|
| III    | 450     | NA      | 900     |
| Lambda | 1.00E−05 | 2.00E−06 | 1.00E−06 |

This table shows that component C2 is no longer periodically inspected and that the inter-inspection interval III of C3 is increased to 900 (vs 700 at the start). This enables inspections further spaced out in time while fulfilling the safety criteria to be programmed.

Figure 13:
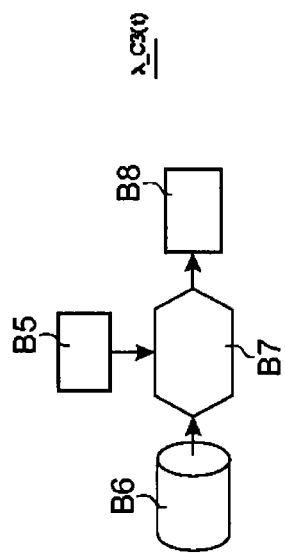
FIG. 13 is a block diagram illustrating the determination of calendar forecasts according to the invention.

On the other hand, FIG. 13 is a block diagram illustrating the determination of the calendar forecasts according to the invention.

Block B6 is a behaviour model of the engine comprising behaviour data from the set of following data: mean running time of the engine, mean duration of the missions, number of missions per day, engine age, and maintenances already performed on the engine.

In block B7, the processing means 7 take account of the behaviour model B6 of the engine and the global model B5 to determine a model of calendar forecasts B8 including maintenance actions to be applied to the engine. It will be noted that for a fleet of aircraft engines, the different behaviour models of the engines are concatenated to form a behaviour model of the fleet.

Thus, the model of calendar forecasts for a fleet of engines implements efficient preventive but less expensive maintenances, and ensuring a high availability without making compromises on safety.

The invention claimed is:

1. A method for forecasting maintenance operations to be applied to an engine or a part of the engine including a set of components, the method comprising:
    building a lifetime model for each component of the set of components;
    analysing the lifetime model associated with each component to build a set of failure models corresponding to the set of components, each component being associated with a failure model defining an inter-inspection interval reflecting an advanced degradation risk rate lower than a predetermined safety threshold;
    defining a maintenance strategy including inspections and opportunistic inspections on the set of components, wherein an opportunistic inspection on a component in the set systematically follows an inspection of a different component in the set; and
    iteratively simulating maintenance actions on the set of components by using the set of failure models and the maintenance strategy to build a global model of relaxed maintenance operations which takes the opportunistic inspections into account while fulfilling the predetermined safety threshold of each component,
    wherein each iteration of the simulation includes:
    modifying at least one inter-inspection interval corresponding to at least one component by taking the opportunistic inspections into account to build a current maintenance model;
    comparing a risk rate associated with each component according to the current maintenance model with the predetermined safety threshold of the component according to the failure models; and
    continuing the simulation until the current maintenance model converges on a last current maintenance model which maximizes inter-inspection intervals of the components while fulfilling the predetermined safety threshold of each component, the last current maintenance model being the global model of relaxed maintenance operations.

2. The method according to claim 1, further comprising defining a behaviour model of the engine including behaviour data from a data set of: mean running time of the engine, mean duration of missions, number of missions per day, engine age, and maintenances already performed on the engine.

3. The method according to claim 2, further comprising determining calendar forecasts of the maintenance actions to be applied to the engine by taking the behaviour model of the engine into account.

4. The method according to claim 1, wherein building the lifetime model for a given component comprises:
    determining a first law of a first transit time $t_{D/S}$ from a safe condition to an intermediate degradation condition of the component;
    determining a second law of a second transit time $t_{EO/S}$ from a safe condition to an advanced degradation condition of the component; and
    using the first and second laws to assess a third law of a third transit time $t_{EO/D}$ from the intermediate degradation condition to the advanced degradation condition of the component, the third law being assessed according to a strong dependency association law between the first and second laws if they are dependent; and the third law being assessed according to a minimum information dependence association law if the first and second laws are independent, with the proviso that the first transit time is shorter than the second transit time.

5. The method according to claim 4, further comprising:
    simulating a sample of numbers $\alpha_i$ evenly distributed on an interval $[0;1]$;
    calculating first quantiles $q_{D/S}(\alpha_i)$ and second quantiles $q_{EO/S}(\alpha_i)$ of level $\alpha_i$ of the first and second laws respectively; and
    assessing the third law as a function of the first and second quantiles.

6. The method according to claim 5, wherein if the first and second laws are dependent, the third law is assessed according to quantiles $q_{EO/D}(\alpha_i)$ equal to the difference between the first $q_{D/S}(\alpha_i)$ and second $q_{EO/S}(\alpha_i)$ quantiles of the first and second laws.

7. The method according to claim 5, wherein if the first and second laws are independent, the assessment of the third law includes:

associating transit durations of the first $q_{D/S}(\alpha_i)$ and second $q_{EO/S}(\alpha_k)$ quantiles, by ensuring an independency between them with the proviso that the first transit time $t_{ws}$ is shorter than the second transit time $t_{EO/S}$, and assessing the third law according to a duration sample determined by subtracting the transit durations of the first $q_{D/S}(\alpha_i)$ and second $q_{EO/S}(\alpha_k)$ quantiles associated between them.

8. The method according to claim 1, used for a fleet of aircraft engines.

9. A system for forecasting maintenance operations to be applied to an engine or a part of the engine including a set of components, comprising:

processing means for building a lifetime model for each component of the set of components;

processing means for analysing the lifetime model associated with each component to build a set of failure models corresponding to the set of components, each component being associated with a failure model defining an inter-inspection interval reflecting an advanced degradation risk rate lower than a predetermined safety threshold;

processing means for defining a maintenance strategy including inspections and opportunistic inspections on the set of components, wherein an opportunistic inspection on a component in the set results from an inspection of another component in the set and systematically follows the inspection of the another component; and processing means for iteratively simulating maintenance actions on the set of components by using the set of failure models and the maintenance strategy to build a global model of relaxed maintenance operations which takes the opportunistic inspections into account while fulfilling the predetermined safety threshold of each component, wherein the processing means for iteratively simulating maintenance actions includes means for, during each iteration of the simulation:

modifying at least one inter-inspection interval corresponding to at least one component by taking the opportunistic inspections into account to build a current maintenance model;

comparing a risk rate associated with each component according to the current maintenance model with the predetermined safety threshold of the component according to the failure models; and continuing the simulation until the current maintenance model converges on a last current maintenance model which maximizes inter-inspection intervals of the components while fulfilling the predetermined safety threshold of each component, the last current maintenance model being the global model of relaxed maintenance operations.

10. The system according to claim 9, comprising: processing means for:

programming a first inspection on a first component of the engine or part of the engine; and following the first inspection, programming an opportunistic inspection of a second component based upon one of a nature or a condition of the first component determined during the first inspection.

11. The method according to claim 1, comprising:

programming a first inspection on a first component of the engine or part of the engine; and following the first inspection, programming an opportunistic inspection of a second component based upon one of a nature or a condition of the first component determined during the first inspection.

12. The method according to claim 11, comprising:

programming an opportunistic inspection for each of a plurality of components based upon one of the nature or condition of the first component determined during the first inspection.

13. The system according to claim 10, comprising processing means for programming an opportunistic inspection for each of a plurality of components based upon one of the nature or condition of the first component determined during the first inspection.

14. The method according to claim 1, comprising:

wherein the opportunistic inspection on the component in the set results from a nature or condition of the different component in the set.

15. The system according to claim 9, comprising:

wherein the opportunistic inspection on the component in the set results from a nature or condition of the different component in the set.

16. The method according to claim 1, comprising:

programming the inspection on the different component in the set;

automatically programming an opportunistic inspection of the component in the set following the first inspection.

17. The method according to claim 1, comprising:

programming the inspection on the different component in the set including scheduling a maintenance operation on the different part; and scheduling the opportunistic inspection of the component in the set as part of the maintenance operation.

18. The system according to claim 9, wherein the processing means for defining the maintenance strategy automatically programs the opportunistic inspection on the one component following a maintenance operation related to the inspection on the another component.

19. The system according to claim 9, wherein the processing means for defining the maintenance strategy programs the inspection on the another part to include a maintenance operation on the another part and conducting the opportunistic inspection on the component in the set as part of the maintenance operation.

20. A method for forecasting maintenance operations to be applied to an engine or a part of the engine including a set of components, the method comprising:

building a lifetime model for each component of the set of components;

analysing the lifetime model associated with each component to build a set of failure models corresponding to the set of components, each component being associated with a failure model defining an inter-inspection interval reflecting an advanced degradation risk rate lower than a predetermined safety threshold;

defining a maintenance strategy including inspections and opportunistic inspections on the set of components, wherein an opportunistic inspection on a component in the set systematically follows an inspection of a different component in the set; and iteratively simulating maintenance actions on the set of components by using the set of failure models and the maintenance strategy to build a global model of relaxed maintenance operations which takes the opportunistic inspections into account while fulfilling the predetermined safety threshold of each component, wherein building the lifetime model for a given component comprises:

determining a first law of a first transit time $t_{D/S}$ from a safe condition to an intermediate degradation condition of the component;

determining a second law of a second transit time $t_{EO/S}$ from a safe condition to an advanced degradation condition of the component; and using the first and second laws to assess a third law of a third transit time $t_{EO/S}$ from the intermediate degradation condition to the advanced degradation condition of the component, the third law being assessed according to a strong dependency association law between the first and second laws if they are dependent; and the third law being assessed according to a minimum information dependence association law if the first and second laws are independent, with the proviso that the first transit time is shorter than the second transit time.

\* \* \* \* \*